Sept. 7, 1926.

J. C. ROHLFS 1,598,881

LUBRICATING DEVICE

Filed Jan. 17, 1925   2 Sheets-Sheet 1

INVENTOR.
John Charles Rohlfs
BY
ATTORNEYS.

Sept. 7, 1926.

J. C. ROHLFS 1,598,881

LUBRICATING DEVICE

Filed Jan. 17, 1925   2 Sheets-Sheet 2

INVENTOR.
John Charles Rohlfs
BY Booth & Booth
ATTORNEYS.

Patented Sept. 7, 1926.

1,598,881

UNITED STATES PATENT OFFICE.

JOHN CHARLES ROHLFS, OF SAN FRANCISCO, CALIFORNIA, ASSIGNOR OF THIRTY ONE-HUNDREDTHS TO JAMES A. CRONIN AND THIRTY ONE-HUNDREDTHS TO GEORGE E. PENDERGAST, BOTH OF SAN FRANCISCO, CALIFORNIA.

LUBRICATING DEVICE.

Application filed January 17, 1925. Serial No. 3,092.

My invention relates to lubricating devices of the timed positive feed type.

The principal object of my invention is to provide a device for accurately controlling, both as to time and quantity, the lubricant fed to a moving part or member, thereby preventing waste, as well as the deleterious effects often resulting from an excess of lubricant. In the lubrication of such parts as the pistons of Diesel or other internal combustion engines, any excess of lubricant results in an accumulation of carbon in the combustion chamber and on the head and around the rings of the piston; and in the lubrication of the pistons of ammonia compressors as employed in refrigerating machines, excessive lubricant forms an insulating coating on the walls of the radiating passages, thereby reducing the efficiency of the apparatus. Other deleterious effects of excessive lubrication in various forms of machinery are well known, not the least being the cost of the lubricant wasted.

My invention is herein described and illustrated as embodied in a device for lubricating a Diesel engine piston, but it will be apparent that it may be equally well applied to the lubrication of other reciprocating pistons, or to any other moving parts without material change. It is to be understood, moreover, that the form and construction herein shown and described may be varied, within the limits of the claims hereto appended, without departing from the spirit of the invention as set forth in said claims.

The lubrication of engine or other pistons by means of the usual forms of force-feed or pump oilers is unsatisfactory for two reasons. First, because the length of the oil feed pipe from the pump to the discharge outlet renders it impossible accurately to time the ejection of the oil to occur at the instant the piston is passing; and this difficulty is greatly increased in such machines as large size Diesel engines, on account of the relatively long oil pipes leading from the oil pump to the cylinders; and secondly, because the liquid oil, on account of its viscosity, will not spread in an even film over the entire surface of the piston.

I overcome these objections, in my present invention, by the use of a compressible fluid carrying medium, preferably air under rather high pressure, by which the liquid lubricant is carried into the cylinder and against the passing side face of the piston, in an atomized condition. The use of such a carrying medium enables its discharge to be accurately timed by a simple valve device actuated by or in timed relation to the piston itself, so that the lubricant may be carried into the cylinder at the exact instant during which the piston traverses the discharge aperture; and moreover, the injected lubricant, being atomized and carried in an expanding gaseous medium, is spread out in a more even film between the piston and the cylinder wall. As a result of the use of such a gaseous carrying medium, the amount of lubricant fed to a piston can be materially reduced without impairing its proper lubrication.

A further object of my invention is to provide means for controlling the operation of the carrying medium admission valve in such a manner that it need not be opened at every stroke of the piston. By means of this arrangement, a full charge of oil is admitted to the cylinder at one or several successive strokes of the piston, and the valve then remains closed for a number of strokes, or until the oil film surrounding the piston again needs replenishing. As a result, the consumption of oil may be reduced to a minimum without reducing each admitted charge to such a degree as to render it ineffective.

With this in view my invention will now be fully described with reference to the accompanying drawings, wherein:—

Figure 1:
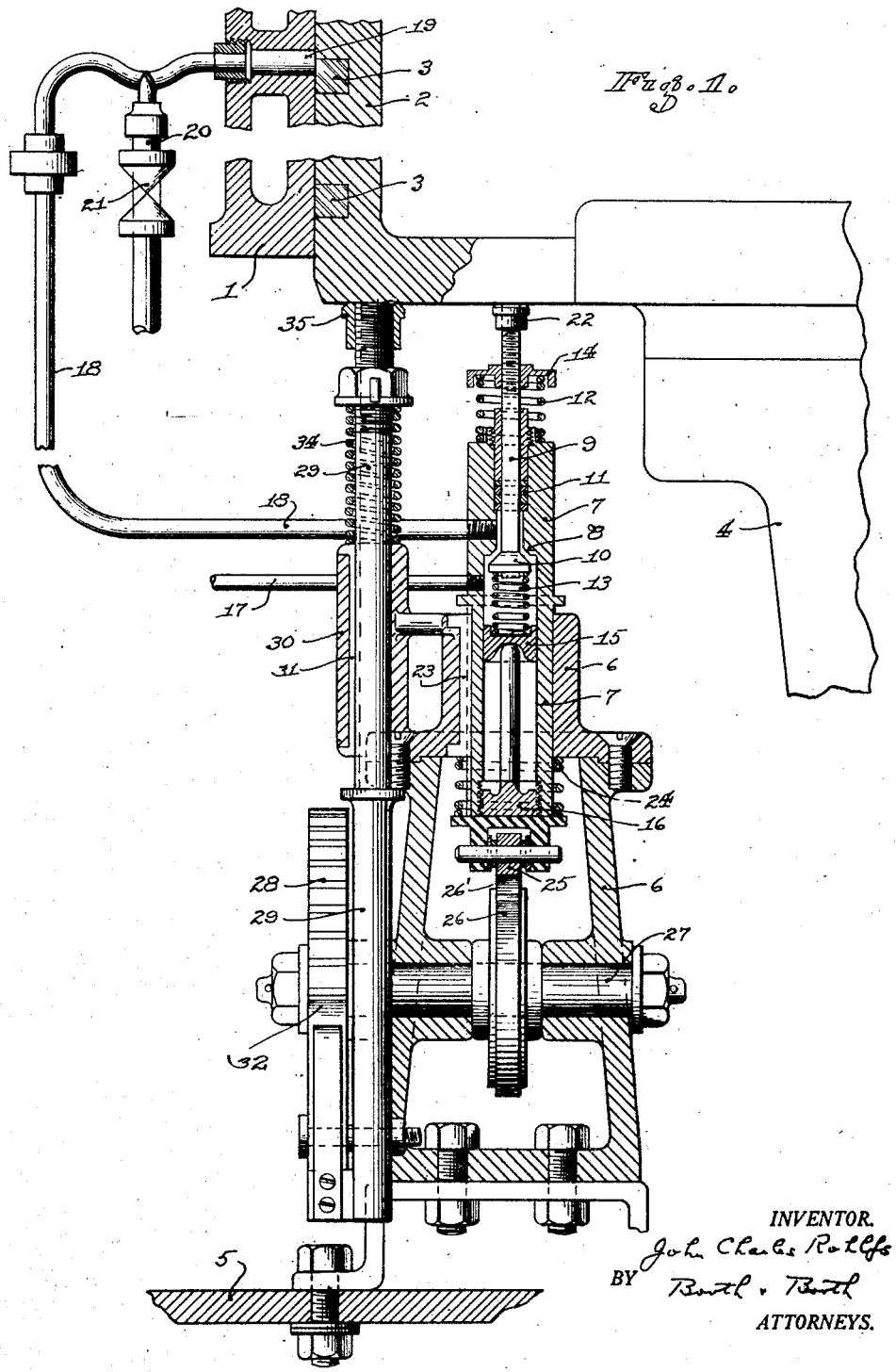
Fig. 1 is a vertical part-sectional view showing a preferred embodiment of my invention as applied to a Diesel engine.

In the drawings, the reference numeral 1 designates a portion of the cylinder wall, or more properly the cylinder extension, of a Diesel engine, and 2 is the piston operating therein. The usual piston rings are shown at 3, and the piston rod indicated at 4. 5 is a portion of the usual drip pan, and may be taken to represent any fixed member associated with the engine frame.

A base member 6 is mounted upon the fixed support 5, and carries a valve housing 7, provided with an interior valve seat at 8. A stem 9, having a head 10 adapted to coact with said seat, is slidably mounted in said housing 7, and is provided with suitable packing 11. Said stem is normally held at the upward limit of its travel, to keep the valve formed by the seat 8 and the head 10 closed, by springs 12 and 13, the former acting against a collar 14 adjustably secured to the upper projecting portion of the stem 9, and the latter acting between the head 10 and a member 15 supported by a plug 16 screwed into or otherwise secured to the lower end of the housing 7.

An inlet pipe 17, leading into the valve housing 7 below the seat 8, supplies the air or other carrying medium, under suitable pressure, from any convenient source, not shown. An outlet pipe 18 leads from said housing 7 above the seat 8 and communicates with an aperture 19 in the cylinder wall. A connection 20 supplies the lubricant, from any convenient source not shown, to the air pipe 18 in such a manner that said lubricant is picked up by the stream of air passing through said pipe 18 and is carried into the cylinder in an atomized condition. The construction of the lubricant or oil connection 20 is not material to the present invention, the showing of the drawing being merely typical of any form of device which will properly feed the oil into the stream of air passing through the pipe 18. A valve, indicated at 21, is preferably provided for regulating the amount of oil supplied to said air stream.

The valve stem 9 is provided at its upper end with an adjustable head 22 adapted to be engaged by the piston 2 at the bottom of its stroke. Therefore, when said piston reaches its lowermost position, said stem is depressed as shown, and the valve is momentarily opened to permit air to flow through the pipe 18 and to carry a charge of oil into the cylinder and against the side of the piston. On account of the use of a gaseous carrying medium such as air, the action of the device is practically instantaneous, so that a charge of atomized oil is forced against the side of the piston at the instant of its passage across the discharge aperture 19.

If the valve 8—10 were opened at every stroke of the piston 2 either too much oil would be carried into the cylinder, or the amount of oil carried in each charge would have to be reduced to such an extent as to render the charge ineffective in properly distributing the oil over the surface of the piston. Therefore I provide the following mechanism for causing said valve to be opened periodically instead of at every piston stroke.

Figure 2:
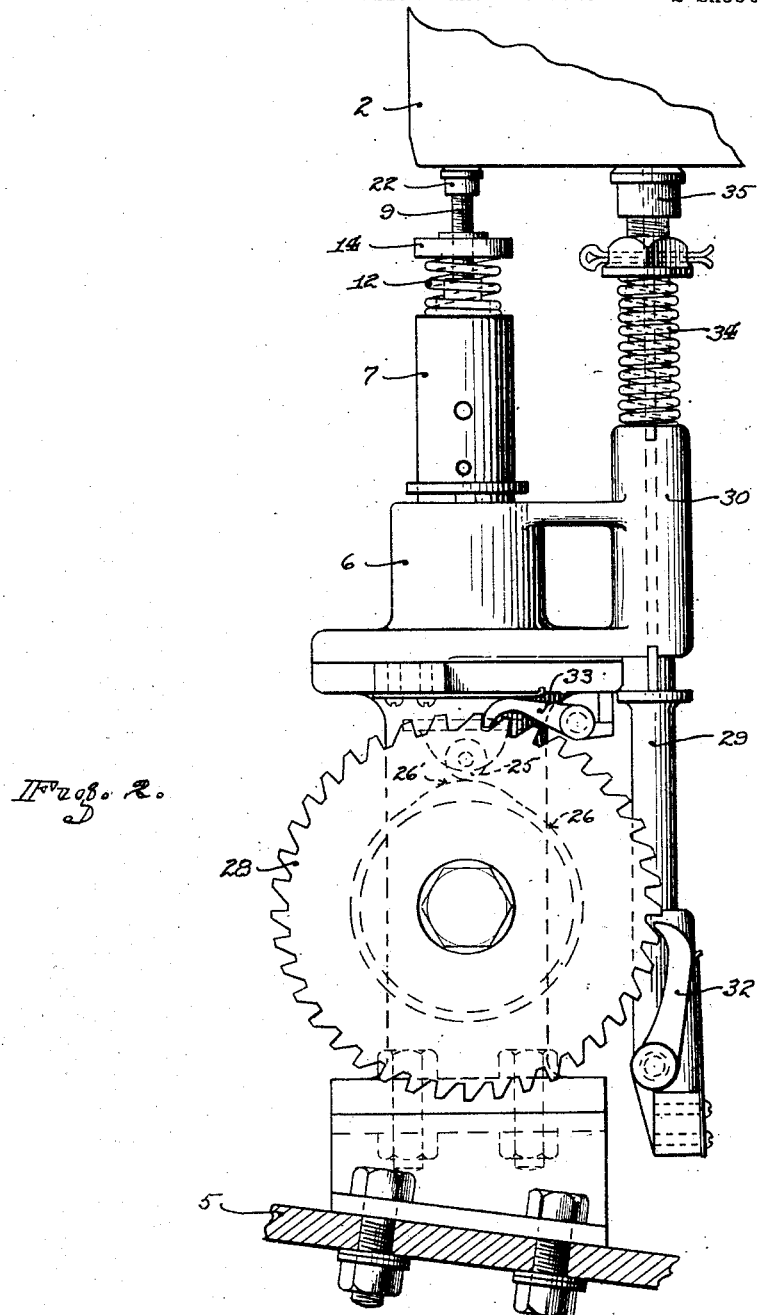
Fig. 2 is an end elevation thereof, viewed from the left of Fig. 1.

The housing 7 is capable of limited vertical movement in the base 6, being held against rotation by a key 23, and retained in its lowermost position by a spring 24. The lower end of said housing carries a roller 25, which rides upon a cam 26 secured to a horizontal shaft 27. Said shaft, which is rotatably mounted in the base 6, carries a ratchet wheel 28. A vertical plunger or rod 29, slidably mounted in a journal 30 secured to the base 6 and prevented from turning therein by a key 31, carries a pawl 32, Fig. 2, adapted to engage and turn said ratchet wheel 28 upon the upward movement of said rod. A retaining pawl 33 also engages said ratchet wheel to prevent backward movement thereof.

The rod 29 is normally held in its uppermost position by a spring 34, and carries an adjustable head 35 at its upper end, which is engaged by the piston 2 at the bottom of its stroke. Therefore, at each stroke of said piston, the rod 29 is caused to reciprocate, thereby turning the ratchet wheel 28 and the cam 26 through an angular distance equal to one or more teeth of said wheel. Said cam thus rotates, with an intermittent motion, and when its high point 26' passes under the roller 25, the valve housing 7 is raised sufficiently to cause its stem 9 to be engaged by the piston 2, and during the remaining portion of the revolution of said cam, the housing 7 is lowered to such a point that the stem 9 is not engaged by said piston. Thus the valve 8—10 is opened at one or a number of successive strokes of the piston, depending upon the profile of the cam 26, and thereafter remains closed for a greater number of successive strokes.

I claim:—

1. A device for the described purpose comprising a conduit adapted to convey a fluid carrying medium to a reciprocating member; a valve for controlling the flow of said carrying medium; means positioned in the path of said reciprocating member and adapted to be actuated thereby for operating said valve; means for periodically removing said valve operating means from the path of said reciprocating member; and means for supplying lubricant to said carrying medium.

2. The combination with a moving member, of a conduit for supplying lubricant thereto; a valve for controlling the supply of said lubricant, said valve being operated periodically by said member in timed relation to its movement; and means actuated by said member for interrupting the periodic operation of said valve at intervals recurring in timed relation to the movement of said member.

3. The combination with a moving member, of a conduit for conveying a fluid carrying medium thereto; means for supplying lubricant to said carrying medium; a valve for controlling the flow of said carrying medium, said valve being operated periodically by said member in timed relation to its movement; and means actuated by said member for interrupting the periodic operation of said valve at intervals recurring in timed relation to the movement of said member.

4. A device for the described purpose comprising a conduit for supplying lubricant to a reciprocating member; a valve device for controlling the supply of said lubricant, said valve device being positioned in the path of said reciprocating member and adapted to be actuated thereby to operate said valve; and means actuated by said member for periodically moving said valve device out of the path of said member.

5. In combination with a reciprocating member, a valve device operated periodically thereby comprising a fixed support; a valve housing movably mounted therein; a valve member carried by said housing; and means actuated by said reciprocating member for periodically moving said housing to carry said valve member into a position to be engaged and actuated by said reciprocating member.

6. In combination with a reciprocating member, a valve device operated periodically thereby comprising a fixed support; a valve housing movably mounted therein; a valve member carried by said housing; a cam associated with said housing for periodically moving the same to carry said valve member into a position to be engaged and actuated by said reciprocating member; a ratchet wheel associated with said cam; a plunger carried by said support and operated by said reciprocating member; and a pawl carried by said plunger and adapted to engage and rotate said ratchet wheel.

In testimony whereof I have signed my name to this specification.

JOHN CHARLES ROHLFS.